United States Patent
Wang et al.

(10) Patent No.: US 10,613,232 B1
(45) Date of Patent: Apr. 7, 2020

(54) GROUND-BASED AUGMENTATION SYSTEM CAPABLE OF PREDICTING TROPOSPHERIC REFRACTIVE INDEX WITH HIGH PRECISION

(71) Applicant: Beihang University, Beijing (CN)

(72) Inventors: Zhipeng Wang, Beijing (CN); Yanbo Zhu, Beijing (CN); Yuanyuan Zhuang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/431,049

(22) Filed: Jun. 4, 2019

(30) Foreign Application Priority Data

Mar. 27, 2019 (CN) .......................... 2019 1 0236610

(51) Int. Cl.
*G01S 19/07* (2010.01)
*G06N 3/08* (2006.01)
*G01W 1/16* (2006.01)
*G06N 3/04* (2006.01)

(52) U.S. Cl.
CPC ............ *G01S 19/072* (2019.08); *G01S 19/07* (2013.01); *G01W 1/16* (2013.01); *G06N 3/084* (2013.01); *G06N 3/04* (2013.01)

(58) Field of Classification Search
CPC ........ G01S 19/07; G01S 19/072; G01W 1/16; G06N 3/02; G06N 3/084
See application file for complete search history.

(56) References Cited

U.S. PATENT DOCUMENTS 10,282,673 B2 * 5/2019 Wang .................... G06N 20/00

OTHER PUBLICATIONS

Javeed S, Alimgeer KS, Javed W, Atif M, Uddin M (2018) A modified artificial neural network based prediction technique for tropospheric radio refractivity. PLOS ONE 13(3): e0192069. https://doi.org/10.1371/journal.pone.0192069 (Year: 2018).*
Wang, Q. et al. "A Regional Tropospheric Model for Airborne GPS Applications." Science Direct-Advances in Space Research 48. 2011. pp. 362-369. (Year: 2011).*

(Continued)

*Primary Examiner* — Gregory C. Issing
(74) *Attorney, Agent, or Firm* — Locke Lord LLP; Tim Tingkang Xia, Esq.

(57) ABSTRACT

The present invention provides a ground-based augmentation system capable of predicting a tropospheric refractive index with high precision. The system includes a ground base station and an airborne receiver. The ground base station includes a ground acquisition device, a processor, and a transmitter. The ground acquisition device is configured to acquire meteorological parameters of a plurality of years, and use the acquired meteorological parameters as historical data. The processor is configured to call the historical data and establish a back propagation (BP) neural network to predict a refractive index. The transmitter is configured to send the refractive index predicted by the processor to the airborne receiver. With the present invention, the tropospheric refractive index is predicted for different weather conditions, thus improving the precision of tropospheric refractive index prediction.

9 Claims, 6 Drawing Sheets

(56) References Cited

OTHER PUBLICATIONS

Pikridas et al. "Predicting Zenith Tropospheric Delay Using the Artificial Neural Netowrk Technique." 2010. pp. 164-172. (Year: 2010).*

Xiao GongWei, Ou JiKun, Liu GuoLin,et al .2018.Construction of a regional precise tropospheric delay model based on improved BP neural network.Chinese Journal of Geophysics (in Chinese). (Year: 2018).*

Dunyong, Zheng & Wusheng, Hu. (2014). Research on regional zenith tropospheric delay based on neural network technology. Survey Review. 2014. pp. 1-12. (Year: 2014).*

\* cited by examiner

GROUND-BASED AUGMENTATION SYSTEM CAPABLE OF PREDICTING TROPOSPHERIC REFRACTIVE INDEX WITH HIGH PRECISION

CROSS-REFERENCE TO RELATED PATENT APPLICATION

This non-provisional application claims priority to and the benefit of, pursuant to 35 U.S.C. § 119(a), patent application Serial No. CN201910236610.4 filed in China on Mar. 27, 2019. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to the technical field of satellite navigation, and more particularly to a ground-based augmentation system (GBAS) capable of predicting a tropospheric refractive index with high precision.

BACKGROUND

Global satellite navigation systems can provide users with all-weather, all-day, real-time, high-precision navigation and positioning services. However, there are many errors in satellite navigation and positioning, such as satellite clock error, satellite orbit error, ionospheric error, tropospheric error, and receiver clock error. The tropospheric error may cause a positioning error of up to 2 to 3 m.

The troposphere is the part of the Earth's atmosphere close to the ground, and contains approximately 75% of the atmosphere's mass and at least 90% of the total mass of water vapor. The thickness of the troposphere varies with the latitude. The atmosphere is thin at a high latitude and thick at a low latitude. Many atmospheric phenomena such as rain, snow, wind, and fog may occur in the troposphere. These weather phenomena can adversely affect the signal propagation.

When a satellite emits a signal downward, the signal is delayed due to the presence of substances such as water vapor in the atmosphere when passing through the troposphere. Such a delay is related to the atmospheric refractive index, and the atmospheric refractive index is related to the temperature and pressure in the atmosphere. The atmospheric refractive index may include dry atmospheric refractive index and wet atmospheric refractive index.

A ground-based augmentation system (GBAS) is a device that provides more accurate services for aircrafts during the approach and landing process. During the landing of an aircraft, the satellite navigation system cannot fully meet the aircraft's requirements on precision, integrity, and availability. Therefore, the GBAS is required to improve navigation precision, integrity and reliability. In the process of correction of the positioning error by the GBAS, the tropospheric error cannot be ignored. The tropospheric error is inseparable from the atmospheric refractive index.

However, because GBASs at different places are set up at different time points, the amounts of climatological data acquired by the GBASs are different, and the amounts of meteorological data of the GBASs are also different. Different meteorological data affect the prediction of atmospheric refractive index, leading to low precision in tropospheric refractive index prediction.

Therefore, in order to solve the problems in the prior art, there is a need for a ground-based augmentation system capable of predicting a tropospheric refractive index with high precision, to improve the precision of tropospheric refractive index prediction.

SUMMARY

An aspect of the present invention is to provide a ground-based augmentation system capable of predicting a tropospheric refractive index with high precision, the system including a ground base station and an airborne receiver, where the ground base station includes a ground acquisition device, a processor, and a transmitter, where the ground acquisition device is configured to acquire meteorological parameters of a plurality of years, and use the acquired meteorological parameters as historical data;

the processor is configured to call the historical data and establish a back propagation (BP) neural network to predict a refractive index, and, the transmitter is configured to send the refractive index predicted by the processor to the airborne receiver; and where the processor executes the following instructions:

a) calling historical data from a database to acquire meteorological parameters;

b) calculating refractive indexes according to the acquired meteorological parameters;

c) establishing a BP neural network, including the following steps:

c1) grouping the refractive indexes obtained in the step b) into x groups, each group having an interval $$i = \frac{N_{max} - N_{min}}{x},$$

where $N_{max}$ is a maximum value of the obtained refractive indexes, and $N_{min}$ is a minimum value of the obtained refractive indexes;

c2) drawing a distribution histogram of frequencies of occurrence of refractive indexes based on the groups obtained in the step c1), calculating frequencies $p_1, p_2 \ldots p_p$ of the groups of refractive indexes, and dividing the refractive indexes into a test set and a training set according to a data amount of each group of refractive indexes corresponding to the frequency of each group of refractive indexes; and setting the number of hidden layers of the BP neural network, and forwardly passing each group of refractive indexes through an input layer, the hidden layers, and an output layer;

c3) calculating an error of each group of refractive indexes in the BP neural network during a forward pass process, distributing the error to the output layer, the hidden layers, and the input layer to initiate a backward pass, to correct weights of the output layer and the hidden layers;

c4) repeating the steps c1) to c3) to continuously adjust distribution of weights of the output layer and the hidden layers, to complete preliminary establishment of the BP neural network; and c5) selecting a refractive index from the test set, inputting the refractive index to the preliminarily established BP neural network for evaluation, and if the established BP neural network satisfies a prediction result, determining that the establishment of the BP neural network is complete, or if the established BP neural network cannot satisfy the prediction result, repeating the steps c1) to c4), to reestablish a BP neural network; and d) calculating refractive indexes of meteorological parameters to be predicted, and inputting the refractive indexes to the established BP neural network to predict the refractive index.

Preferably, the refractive index is calculated from the meteorological parameters by using the following method:

$$N_w = \frac{k_2 e}{T} + \frac{k_3 e}{T},$$

$$N_d = \frac{k_1 P}{T},$$

$$N_i = N_w + N_d,$$

where $k_1=77.604$, $k_2=64.79$, $k_3=377,600$, e is pressure of water vapor (hpa), P is barometric pressure (Pa), T is temperature (K), $N_w$ is a tropospheric wet refractive index, $N_d$ is a tropospheric dry refractive index, and $N_i$ is a tropospheric refractive index.

Preferably, the number of hidden layers of the BP neural network is calculated by using the following method:

$$l = \sqrt{n+m} + a,$$

where, l is the number of hidden layers, n is the number of neurons in the input layer, m is the number of neurons in the output layer, and a is a number from 0 to 10, inclusive.

Preferably, the data amount of each group of refractive indexes corresponding to the frequency of each group of refractive indexes satisfies the following relationship:

$$p_{ij} = \frac{p_i}{p_j} = \frac{n_i}{n_j},$$

where $p_i$ is the frequency of the ith group of refractive indexes, $p_j$ is the frequency of the jth group of refractive indexes, $n_i$ is the number of refractive indexes selected from the ith group, $n_j$ is the number of refractive indexes selected from the jth group, and $p_{ij}$ is a ratio of the frequency of the ith group of refractive indexes to the frequency of the jth group of refractive indexes.

Preferably, in the process of forwardly passing each group of refractive indexes through the input layer, the hidden layers, and the output layer, each group of refractive indexes is processed as follows before being input to the input layer:

$N_p = N_i - \bar{N}$, where $N_p$ is a difference between a refractive index of each day and an average value, $N_i$ is the refractive index of each day, and $\bar{N}$ is the average value of refractive indexes;

the ith neuron output in the hidden layer satisfies:

$$a1_i = f_1\left(\sum_{j=1}^{r} w1_{ij} N_p\right), i = 1, 2, 3, \ldots s,$$

where $a1_i$ is the ith neuron output in the hidden layer, $w1_{ij}$ is a weight corresponding to the jth neuron input in the hidden layer and the ith neuron output in the hidden layer;

the kth neuron output in the output layer satisfies:

$$a2_k = f_2\left(\sum_{i=1}^{r} w2_{ki} a1_i\right), k = 1, 2, \ldots s,$$

where $w2_{ki}$ is a weight corresponding to the ith neuron input in the output layer and the kth neuron output in the output layer, $a1_i$ is the ith neuron output in the hidden layer, $a2_k$ is the kth output in the output layer, and $f_1$ and $f_2$ are activation functions.

Preferably, the error of each group of refractive indexes in the BP neural network during the forward pass process is calculated by using the following method:

$$E_1 = \frac{1}{2}\sum_{k=1}^{s}(N_p - a2_k)^2,$$

where $N_p$ is a difference between a refractive index of each day and an average value, $a2_k$ is the kth neuron output in the output layer, and $E_1$ is a predicted squared error.

Preferably, the error of each group of refractive indexes in the BP neural network during the forward pass process is weighted:

$E(W,B) = c_m E_1$, where $c_m$ is a weight, $E_1$ is a predicted squared error, and $E(W, B)$ is a weighted prediction error.

Preferably, in the backward pass, the weights of the output layer and the hidden layers are corrected by using the following method:

1) a weight correction value of the output layer is calculated by using the following method:

$$\Delta w2_{ki} = -\eta \frac{\partial E}{\partial w2_{ki}} = -\eta \frac{\partial E}{\partial a2_k}\frac{\partial a2_k}{\partial w2_{ki}},$$

where $\Delta w2_{ki}$ is a weight correction value corresponding to the ith neuron input in the output layer and the kth neuron output in the output layer, $a2_k$ is the kth neuron output in the output layer, $w2_{ki}$ is a weight corresponding to the ith neuron input in the output layer and the kth neuron output in the output layer, E is a weighted prediction error, and $\eta$ is a rate of descent;

2) a weight correction value of the hidden layers is calculated by using the following method:

$$\Delta w1_{ij} = -\eta \frac{\partial E}{\partial w1_{ij}} = -\eta \frac{\partial E}{\partial a2_k}\frac{\partial a2_k}{\partial a1_i}\frac{\partial a1_i}{\partial w1_{ij}},$$

where $\Delta w1_{ij}$ is a weight correction value corresponding to the jth neuron input in the hidden layer and the ith neuron output in the hidden layer, $a1_i$ is the ith neuron output in the hidden layer, $a2_k$ is the kth neuron output in the output layer, $w1_{ij}$ is a weight corresponding to the jth neuron input in the hidden layer and the ith neuron output in the hidden layer, E is a weighted prediction error, and $\eta$ is a rate of descent.

Another aspect of the present invention is to provide a ground-based augmentation system capable of predicting a tropospheric refractive index with high precision, the system including a ground base station and an airborne receiver, where the ground base station includes a ground acquisition device, a processor, and a transmitter, where the ground acquisition device is configured to acquire meteorological parameters of a plurality of years, and use the acquired meteorological parameters as historical data;

the processor is configured to call the historical data and establish a back propagation (BP) neural network to predict a refractive index, and, the transmitter is configured to send the refractive index predicted by the processor to the airborne receiver; and where the processor executes the following instructions:

A) calling historical data from a database to acquire meteorological parameters;

B) calculating refractive indexes according to the acquired meteorological parameters;

C) establishing a BP neural network, including the following steps:

C1) grouping the refractive indexes obtained in the step B) into x groups, selecting a cross combination of x−2 groups of refractive indexes as a training set, and selecting either of the remaining two groups of refractive indexes as a test set; and setting the number of hidden layers of the BP neural network, and forwardly passing each group of refractive indexes in the training set through an input layer, the hidden layers, and an output layer;

C2) calculating an error of each group of refractive indexes in the BP neural network during a forward pass process, distributing the error to the output layer, the hidden layers, and the input layer to initiate a backward pass, to correct weights of the output layer and the hidden layers;

C3) repeating the step C1) to C2) to continuously adjust distribution of weights of the output layer and the hidden layers, to complete preliminary establishment of the BP neural network; and C4) selecting one group of refractive indexes in the test set, inputting the selected group of refractive indexes to the preliminarily established BP neural network for evaluation, and if the established BP neural network satisfies a prediction result, determining that the establishment of the BP neural network is complete, or if the established BP neural network cannot satisfy the prediction result, repeating the steps C1) to C3), to reestablish a BP neural network; and D) calculating refractive indexes of meteorological parameters to be predicted, and inputting the refractive indexes to the established BP neural network to predict the refractive index.

Still another aspect of the present invention is to provide a ground-based augmentation system capable of predicting a tropospheric refractive index with high precision, the system including a ground base station and an airborne receiver, where the ground base station includes a ground acquisition device, a processor, and a transmitter, where the ground acquisition device is configured to acquire meteorological parameters of a plurality of years, and use the acquired meteorological parameters as historical data;

the processor is configured to call the historical data and establish a back propagation (BP) neural network to predict a refractive index, and, the transmitter is configured to send the refractive index predicted by the processor to the airborne receiver; and where the processor executes the following instructions:

(1) calling historical data from a database to acquire and normalize meteorological parameters;

(2) classifying some meteorological parameters of abnormal weather to form an abnormal weather database;

(3) when a piece of new meteorological parameter data is input to the abnormal weather database, introducing the number of peak values that appear within a period of time on a curve of the meteorological parameter with time, as well as a slope of the curve of the meteorological parameter with time within a period of time, air temperature, and air pressure, and calculating a distance between the new data and sample data;

(4) within a range using new data as an origin and having a diameter of R, determining and recording a weather category of the new data according to frequencies of occurrence of different weather categories;

(5) inputting a next piece of new meteorological data to the abnormal weather database, and repeating the steps (3) to (4); and (6) calculating refractive indexes according to the meteorological parameters of abnormal weather, and establishing a BP neural network to predict a refractive index to be predicted. With the present invention, the tropospheric refractive index is predicted for different weather conditions, thus improving the precision of tropospheric refractive index prediction.

It should be understood that the foregoing general description and the following detailed description are exemplary and explanatory, and are not intended to limit the contents the present invention seeks to protect.

BRIEF DESCRIPTION OF THE DRAWINGS

More objectives, functions, and advantages of the present invention will be set forth in the following description of specific embodiments of the present invention with reference to the accompanying drawings, in which.

DETAILED DESCRIPTION

The objectives and functions of the present invention and methods for achieving such objectives and functions will be illustrated through exemplary embodiments. However, the present invention is not limited to the exemplary embodiments disclosed below, but may be implemented in different forms. The essence of this specification is merely for the purpose of helping those skilled in the art to comprehensively understand the specific details of the present invention.

Figure 1:
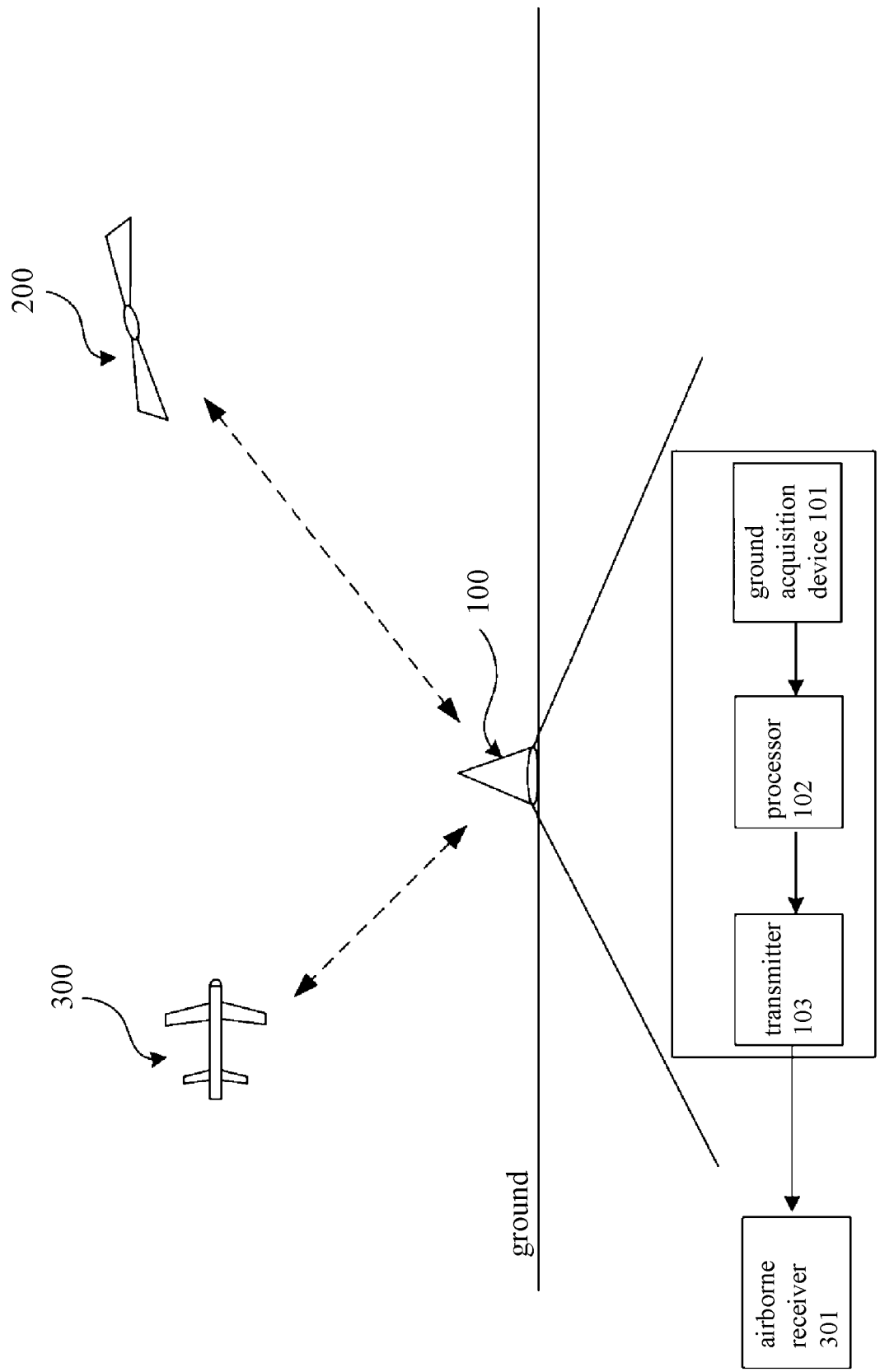
FIG. 1 is a schematic diagram of a ground-based augmentation system capable of predicting a tropospheric refractive index with high precision according to the present invention.

Hereinafter, the embodiments of the present invention will be described with reference to the accompanying drawings, and relevant technical terms should be well known to those skilled in the art. In the accompanying drawings, same reference numerals denote same or similar parts or steps, unless otherwise specified. The contents of the present invention are described below through specific embodiments. FIG. 1 is a schematic diagram of a ground-based augmentation system capable of predicting a tropospheric refractive index with high precision. To solve the problem of refractive index prediction error caused by different meteorological data, a ground-based augmentation system (GBAS) capable of predicting a tropospheric refractive index with high precision according to an embodiment of the present invention includes a ground base station 100 and an airborne receiver arranged on an aircraft 300. The ground base station receives a signal from a satellite 200, and after processing the signal, sends a navigation signal to the aircraft 300.

The ground base station 100 includes a ground acquisition device 101, a processor 102 and a transmitter 103. The ground acquisition device 101 is configured to acquire meteorological parameters of a plurality of years, and use the acquired meteorological parameters as historical data.

The processor 102 is configured to call the historical data and establish a back propagation (BP) neural network to predict a refractive index.

The transmitter 103 is configured to send the refractive index predicted by the processor 102 to the airborne receiver 301 of the aircraft 300, so as to lower the aircraft positioning error.

Embodiment 1

In this embodiment, under normal weather conditions and in the case of a large amount of meteorological data, a BP neural network is established to predict a tropospheric refractive index in the future.

Figure 2:
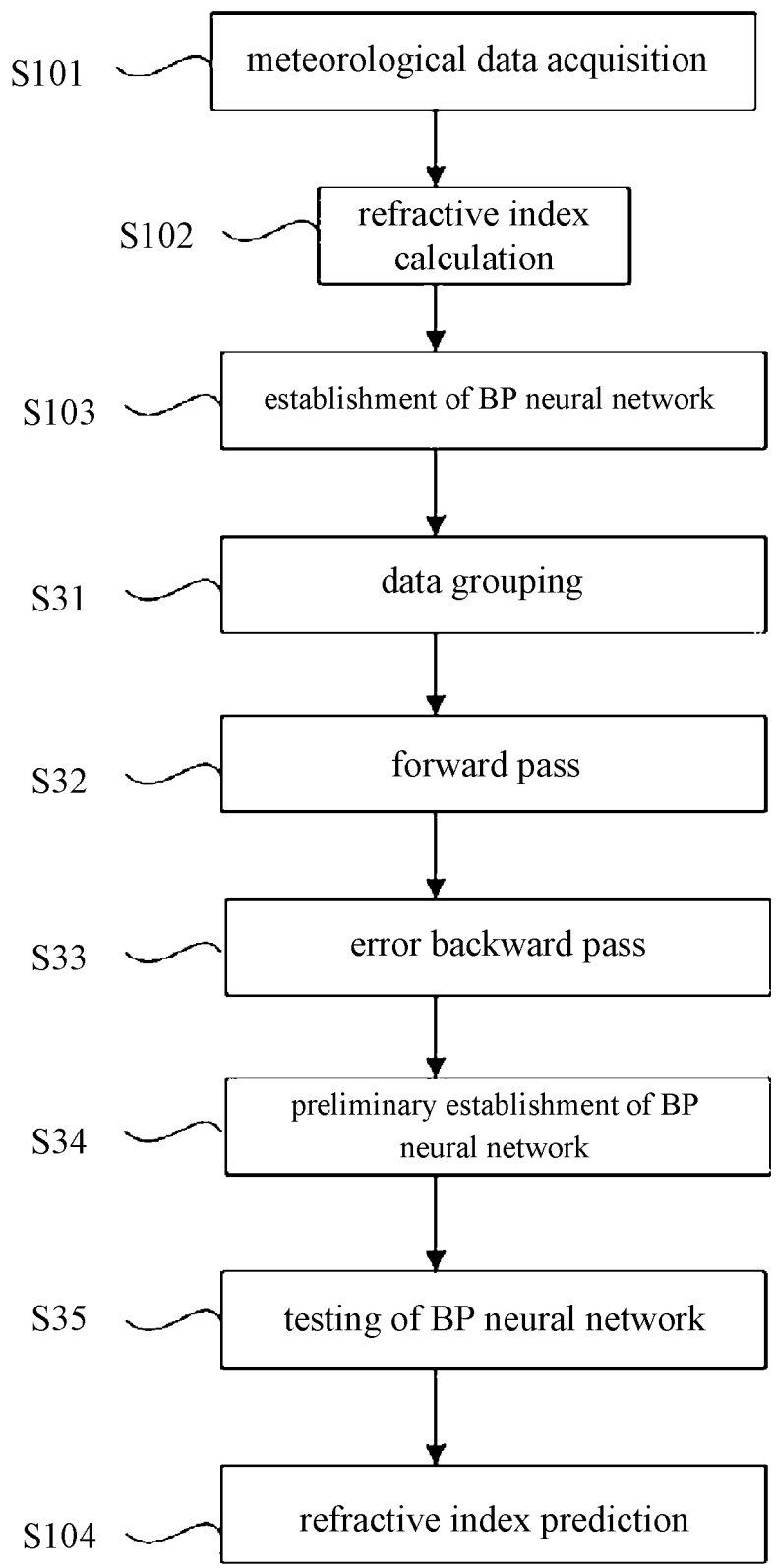
FIG. 2 is a flowchart of predicting a refractive index according to an embodiment of the present invention.

Data processing of the present invention is mainly performed by the processor of the ground base station. FIG. 2 is a flowchart of predicting a refractive index according to an embodiment of the present invention. The processor executes the following instructions:

Step S101, meteorological data acquisition.

Historical data is called from a database to acquire meteorological parameters.

The ground acquisition device 101 acquires meteorological data such as local temperature, humidity, and air pressure, and uses the acquired meteorological parameters as historical data. The processor 102 calls the historical data acquire by the ground acquisition device to acquire the meteorological data such as temperature, humidity, and air pressure.

Step S102, refractive index calculation.

Refractive indexes are calculated according to the acquired meteorological parameters.

According to an embodiment of the present invention, the refractive index is calculated from the meteorological parameters by using the following method:

$$N_w = \frac{k_2 e}{T} + \frac{k_3 e}{T},$$

-continued $$N_d = \frac{k_1 P}{T},$$

$$N_i = N_w + N_d,$$

where $k_1=77.604$, $k_2=64.79$, $k_3=377,600$, e is pressure of water vapor (hpa), P is barometric pressure (Pa), T is temperature (K), $N_w$ is a tropospheric wet refractive index, $N_d$ is a tropospheric dry refractive index, and $N_i$ is a tropospheric refractive index.

Step S103, establishment of BP neural network.

According to an embodiment of the present invention, the establishment of the BP neural network includes the following steps:

S31, data grouping.

The refractive indexes obtained in the step S102 are grouped into x groups, each group having an interval $$i = \frac{N_{max} - N_{min}}{x},$$

where $N_{max}$ is a maximum value of the obtained refractive indexes, and $N_{min}$ is a minimum value of the obtained refractive indexes.

S32, forward pass.

A distribution histogram of frequencies of occurrence of refractive indexes is drawn based on the groups obtained in the step S31, frequencies $p_1$, $p_2$ . . . $p_p$ of the groups of refractive indexes are calculated, and the refractive indexes are divided into a test set and a training set according to a data amount of each group of refractive indexes corresponding to the frequency of each group of refractive indexes.

The data amount of each group of refractive indexes corresponding to the frequency of each group of refractive indexes satisfies the following relationship:

$$p_{ij} = \frac{p_i}{p_j} = \frac{n_i}{n_j},$$

where $p_i$ is the frequency of the ith group of refractive indexes, $p_j$ is the frequency of the jth group of refractive indexes, $n_i$ is the number of refractive indexes selected from the ith group, $n_j$ is the number of refractive indexes selected from the jth group, and $p_{ij}$ is a ratio of the frequency of the ith group of refractive indexes to the frequency of the jth group of refractive indexes.

For example, in the calculation result, in the 1st to 100th pieces of data, if the frequency of the refractive index is 10, 8 refractive indexes are selected as the training set, and the remaining two are selected as the test set; accordingly, in the 101st to 200th pieces of data, if the frequency of the refractive index is 20, 16 refractive indexes are selected as the training set, and the remaining four as selected as the test set.

The number of hidden layers of the BP neural network is set, and each group of refractive indexes is forwardly passed through an input layer, the hidden layers, and an output layer.

The number of hidden layers is closely related to the establishment of the neural network. If the number of hidden layers is too small, the established network is not accurate enough; if the number of hidden layers is too large, complex computations are caused. According to an embodiment of the present invention, the number of hidden layers of the BP neural network is calculated by using the following method:

$$l = \overline{n+m} + a,$$

where, l is the number of hidden layers, n is the number of neurons in the input layer, m is the number of neurons in the output layer, and a is a number from 0 to 10, inclusive.

Forward pass in the data transmission process requires setting of two activation functions ($f_1$ and $f_2$) respectively used for the process of transmission from the input layer to the hidden layer and the process of transmission from the hidden layer to the output layer.

There are two types of activation functions: linear and non-linear. In practice, a nonlinear function is often used. Commonly used nonlinear activation functions include: a log-sigmoid function, of which the input can be any value but the output value ranges from 0 to 1; a Tan-sigmoid function, of which the input value can also be any value but the output value ranges from −1 to 1; and a Purelin function, of which both the input and output can be any values. A person skilled in the art can select a suitable activation function according to a specific situation. In this embodiment, both the two activation functions are Tan-sigmoid functions.

In the backward pass, if the derivative is nearly 0 when partial derivatives are solved, a gradient vanishing phenomenon may occur. Therefore, to solve the phenomenon, in the process of forwardly passing each group of refractive indexes through the input layer, the hidden layers, and the output layer, each group of refractive indexes is processed as follows before being input to the input layer:

$N_p = N_i - \overline{N}$, where $N_p$ is a difference between a refractive index of each day and an average value, $N_i$ is the refractive index of each day, and $\overline{N}$ is the average value of refractive indexes.

In the process of forwardly passing each group of refractive indexes through the input layer, the hidden layers, and the output layer, the ith neuron output in the hidden layer satisfies:

$$a1_i = f_1\left(\sum_{j=1}^{r} w1_{ij} N_p\right), i = 1, 2, 3, \dots s,$$

where $a1_i$ is the ith neuron output in the hidden layer, $w1_{ij}$ is a weight corresponding to the jth neuron input in the hidden layer and the ith neuron output in the hidden layer, $N_p$ is a difference between a refractive index of each day and an average value.

the kth neuron output in the output layer satisfies:

$$a2_k = f_2\left(\sum_{i=1}^{r} w2_{ki} a1_i\right), k = 1, 2, \dots s,$$

where $w2_{ki}$ is a weight corresponding to the ith neuron input in the output layer and the kth neuron output in the output layer, $a1_i$ is the ith neuron output in the hidden layer, $a2_k$ is the kth output in the output layer, and $f_1$ and $f_2$ are activation functions.

S33, error backward pass.

An error of each group of refractive indexes in the BP neural network is calculated during a forward pass process, the error is distributed to the output layer, the hidden layers, and the input layer to initiate a backward pass, to correct weights of the output layer and the hidden layers.

The error of each group of refractive indexes in the BP neural network during the forward pass process is calculated by using the following method:

$$E_1 = \frac{1}{2} \sum_{k=1}^{s} (N_p - a2_k)^2,$$

where $N_p$ is a difference between a refractive index of each day and an average value, $a2_k$ is the kth neuron output in the output layer, and $E_1$ is a predicted squared error.

Because different errors have different impact on positioning, according to an embodiment of the present invention, the error of each group of refractive indexes in the BP neural network during the forward pass process is weighted:

$E(W, B) = c_m E_1$, where $c_m$ is a weight, $E_1$ is a predicted squared error, and $E(W, B)$ is a weighted prediction error.

Because different refractive index errors have different impact on positioning, in this embodiment, one weight is defined for 0-1 m, one weight is defined for 1-2 m, and one weight is defined for 2-3 m. A weight $c_1$ is defined for a variable of 0-1 m, a weight $c_2$ is defined for 1-2 m, and a weight $c_3$ is defined for 2-3 m.

In the backward pass, the weights of the output layer and the hidden layers are corrected by using the following method:

1) a weight correction value of the output layer is calculated by using the following method:

$$\Delta w2_{ki} = -\eta \frac{\partial E}{\partial w2_{ki}} = -\eta \frac{\partial E}{\partial a2_k} \frac{\partial a2_k}{\partial w2_{ki}},$$

where $\Delta w2_{ki}$ is a weight correction value corresponding to the ith neuron input in the output layer and the kth neuron output in the output layer, $a2_k$ is the kth neuron output in the output layer, $w2_{ki}$ is a weight corresponding to the ith neuron input in the output layer and the kth neuron output in the output layer, E is a weighted prediction error, and $\eta$ is a rate of descent;

2) a weight correction value of the hidden layers is calculated by using the following method:

$$\Delta w1_{ij} = -\eta \frac{\partial E}{\partial w1_{ij}} = -\eta \frac{\partial E}{\partial a2_k} \frac{\partial a2_k}{\partial a1_i} \frac{\partial a1_i}{\partial w1_{ij}},$$

where $\Delta w1_{ij}$ is a weight correction value corresponding to the jth neuron input in the hidden layer and the ith neuron output in the hidden layer, $a1_i$ is the ith neuron output in the hidden layer, $a2_k$ is the kth neuron output in the output layer, $w1_{ij}$ is a weight corresponding to the jth neuron input in the hidden layer and the ith neuron output in the hidden layer, E is a weighted prediction error, and $\eta$ is a rate of descent.

S34, preliminary establishment of BP neural network.

Figure 3:
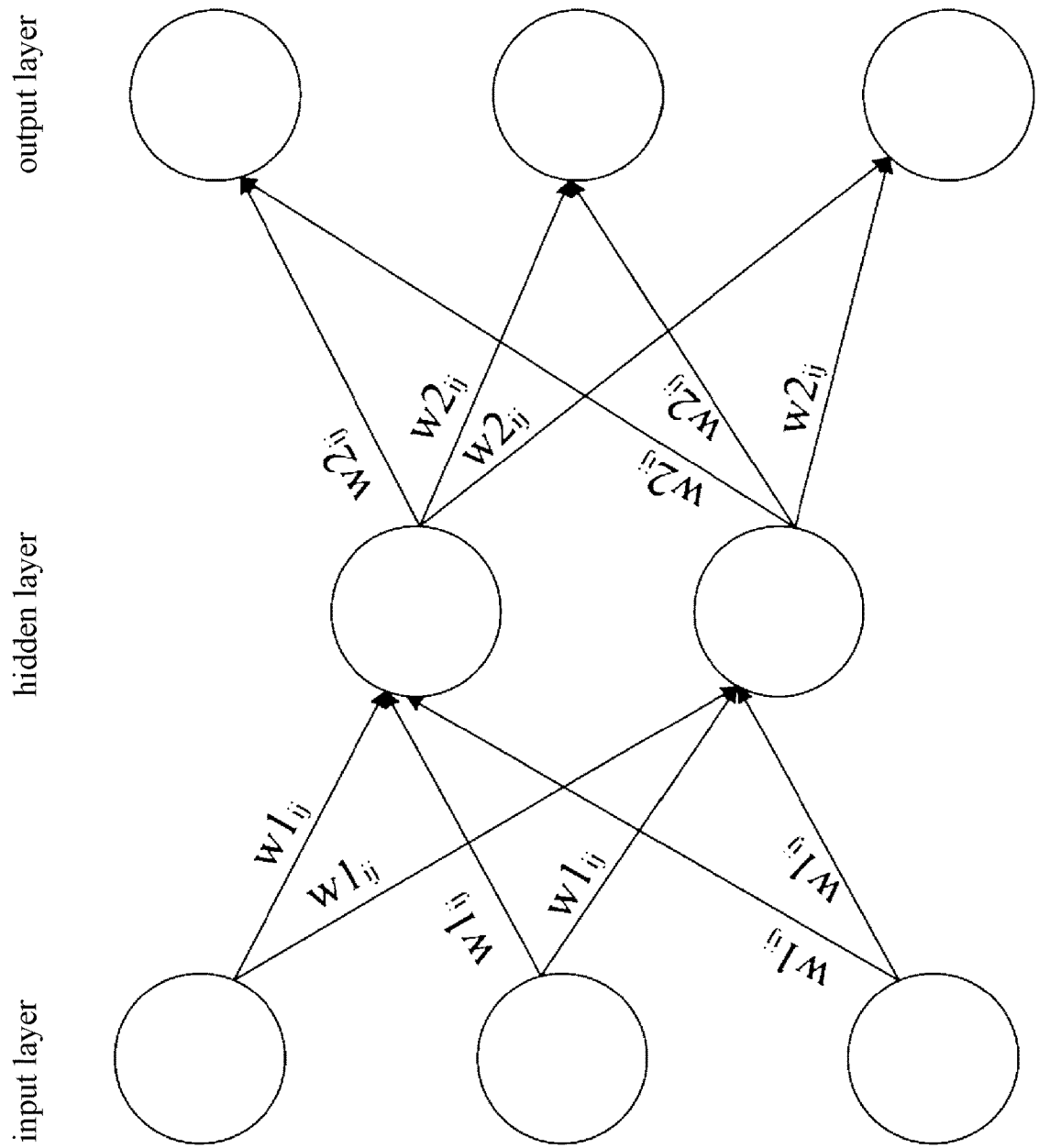
FIG. 3 is a schematic diagram of a BP neural network established according to an embodiment of the present invention.

The steps S31 to S33 are repeated to continuously adjust distribution of weights of the output layer and the hidden layers, to complete preliminary establishment of the BP neural network. FIG. 3 is a schematic diagram of a BP neural network established according to an embodiment of the present invention.

S305, testing of BP neural network.

A refractive index is selected from the test set and input to the preliminarily established BP neural network for evaluation, and if the established BP neural network satisfies a prediction result, determining that the establishment of the BP neural network is complete, or if the established BP neural network cannot satisfy the prediction result, repeating the steps S31 to S34, to reestablish a BP neural network.

Step S104, refractive index prediction.

Refractive indexes of meteorological parameters to be predicted are calculated, and input to the established BP neural network to predict the refractive index. For example, for a group of refractive indexes of meteorological parameters to be predicted, the refractive indexes are calculated by using the method of the step S102, the calculated refractive indexes are input to the established BP neural network to predict the refractive index, and the prediction result is sent to the aircraft, to adjust the positioning of the aircraft. Specifically, the adjustment of the positioning of the aircraft by using the predicted refractive index is implemented by using a method well known to a person skilled in the art, which is not specifically limited in the present invention.

Embodiment 2

In this embodiment, under normal weather conditions and in the case of a small amount of meteorological data, a BP neural network is established to predict a tropospheric refractive index in the future.

The difference between this embodiment and Embodiment 1 lies in the step S31 in which the processor execute the data processing instruction. Referring to the specific description below, the processor executes the following instructions:

Step S101, meteorological data acquisition.

Historical data is called from a database to acquire meteorological parameters. Under normal weather conditions and in the case of a small amount of meteorological data, the training set and the test set are both small. In this embodiment, the division into the training set and the test set is no longer performed, and the data amount is expanded by using a cross validation method.

Step S102, refractive index calculation.

Refractive indexes are calculated according to the acquired meteorological parameters.

According to an embodiment of the present invention, the refractive index is calculated from the meteorological parameters by using the following method:

$$N_w = \frac{k_2 e}{T} + \frac{k_3 e}{T^2},$$

$$N_d = \frac{k_1 P}{T},$$

$$N_i = N_w + N_d,$$

where $k_1$=77.604, $k_2$=64.79, $k_3$=377,600, e is pressure of water vapor (hpa), P is barometric pressure (Pa), T is temperature (K), $N_w$ is a tropospheric wet refractive index, $N_d$ is a tropospheric dry refractive index, and $N_i$ is a tropospheric refractive index.

Step S103, establishment of BP neural network.

According to an embodiment of the present invention, the establishment of the BP neural network includes the following steps:

S31, data grouping.

The refractive indexes obtained in the step S102 are grouped into x groups, a cross combination of x−2 groups of refractive indexes is selected as a training set, and either of the remaining two groups of refractive indexes is selected as a test set; and For example, the calculated refractive indexes are divided into six groups: a, b, c, d, e, and f. (a, b, c, d), (b, c, d) or (a, c, d) may be selected as the training set, and any one of the remaining e groups of data and f groups of data may be selected as the test set.

S32, forward pass.

Setting the number of hidden layers of the BP neural network, and forwardly passing each group of refractive indexes through an input layer, the hidden layers, and an output layer.

The number of hidden layers is closely related to the establishment of the neural network. If the number of hidden layers is too small, the established network is not accurate enough; if the number of hidden layers is too large, complex computations are caused. According to an embodiment of the present invention, the number of hidden layers of the BP neural network is calculated by using the following method:

$$l = \sqrt{n+m} + a,$$

where, l is the number of hidden layers, n is the number of neurons in the input layer, m is the number of neurons in the output layer, and a is a number from 0 to 10, inclusive.

Forward pass in the data transmission process requires setting of two activation functions ($f_1$ and $f_2$) respectively used for the process of transmission from the input layer to the hidden layer and the process of transmission from the hidden layer to the output layer.

There are two types of activation functions: linear and non-linear. In practice, a nonlinear function is often used. Commonly used nonlinear activation functions include: a log-sigmoid function, of which the input can be any value but the output value ranges from 0 to 1; a Tan-sigmoid function, of which the input value can also be any value but the output value ranges from −1 to 1; and a Purelin function, of which both the input and output can be any values. A person skilled in the art can select a suitable activation function according to a specific situation. In this embodiment, both the two activation functions are Tan-sigmoid functions.

In the backward pass, if the derivative is nearly 0 when partial derivatives are solved, a gradient vanishing phenomenon may occur. Therefore, to solve the phenomenon, in the process of forwardly passing each group of refractive indexes through the input layer, the hidden layers, and the output layer, each group of refractive indexes is processed as follows before being input to the input layer:

$N_p = N_i - \overline{N}$, where $N_p$ is a difference between a refractive index of each day and an average value, $N_i$ is the refractive index of each day, and $\overline{N}$ is the average value of refractive indexes.

In the process of forwardly passing each group of refractive indexes through the input layer, the hidden layers, and the output layer, the ith neuron output in the hidden layer satisfies:

$$a1_i = f_1\left(\sum_{j=1}^{r} w1_{ij} N_p\right), i = 1, 2, 3, \ldots s,$$

where $a1_i$ is the ith neuron output in the hidden layer, $w1_{ij}$ is a weight corresponding to the jth neuron input in the hidden layer and the ith neuron output in the hidden layer, $N_p$ is a difference between a refractive index of each day and an average value.

the kth neuron output in the output layer satisfies:

$$a2_k = f_2\left(\sum_{i=1}^{r} w2_{ki} a1_i\right), k = 1, 2, \ldots, s,$$

where $w2_{ki}$ is a weight corresponding to the ith neuron input in the output layer and the kth neuron output in the output layer, $a1_i$ is the ith neuron output in the hidden layer, $a2_k$ is the kth output in the output layer, and $f_1$ and $f_2$ are activation functions.

S33, error backward pass.

calculating an error of each group of refractive indexes in the BP neural network during a forward pass process, distributing the error to the output layer, the hidden layers, and the input layer to initiate a backward pass, to correct weights of the output layer and the hidden layers.

the error of each group of refractive indexes in the BP neural network during the forward pass process is calculated by using the following method:

$$E_1 = \frac{1}{2}\sum_{k=1}^{s}(N_p - a2_k)^2,$$

where $N_p$ is a difference between a refractive index of each day and an average value, $a2_k$ is the kth neuron output in the output layer, and $E_1$ is a predicted squared error.

Because different errors have different impact on positioning, according to an embodiment of the present invention, the error of each group of refractive indexes in the BP neural network during the forward pass process is weighted:

$E(W, B) = c_m E_1$, where $c_m$ is a weight, $E_1$ is a predicted squared error, and $E(W, B)$ is a weighted prediction error.

Because different refractive index errors have different impact on positioning, in this embodiment, one weight is defined for 0-1 m, one weight is defined for 1-2 m, and one weight is defined for 2-3 m. A weight $c_1$ is defined for a variable of 0-1 m, a weight $c_2$ is defined for 1-2 m, and a weight $c_3$ is defined for 2-3 m.

Because different refractive index errors have different impact on positioning, in this embodiment, one weight is defined for 0-1 m, one weight is defined for 1-2 m, and one weight is defined for 2-3 m. A weight $c_1$ is defined for a variable of 0-1 m, a weight $c_2$ is defined for 1-2 m, and a weight $c_3$ is defined for 2-3 m.

In the backward pass, the weights of the output layer and the hidden layers are corrected by using the following method:

1) a weight correction value of the output layer is calculated by using the following method:

$$\Delta w2_{ki} = -\eta \frac{\partial E}{\partial w2_{ki}} = -\eta \frac{\partial E}{\partial a2_k} \frac{\partial a2_k}{\partial w2_{ki}},$$

where $\Delta w2_{ki}$ is a weight correction value corresponding to the ith neuron input in the output layer and the kth neuron output in the output layer, $a2_k$ is the kth neuron output in the output layer, $w2_{ki}$ is a weight corresponding to the ith neuron input in the output layer and the kth neuron output in the output layer, E is a weighted prediction error, and $\eta$ is a rate of descent;

2) a weight correction value of the hidden layers is calculated by using the following method:

$$\Delta w1_{ij} = -\eta \frac{\partial E}{\partial w1_{ij}} = -\eta \frac{\partial E}{\partial a2_k} \frac{\partial a2_k}{\partial a1_i} \frac{\partial a1_i}{\partial w1_{ij}},$$

where $\Delta w1_{ij}$ is a weight correction value corresponding to the jth neuron input in the hidden layer and the ith neuron output in the hidden layer, $a1_i$ is the ith neuron output in the hidden layer, $a2_k$ is the kth neuron output in the output layer, $w1_{ij}$ is a weight corresponding to the jth neuron input in the hidden layer and the ith neuron output in the hidden layer, E is a weighted prediction error, and $\eta$ is a rate of descent.

S34, preliminary establishment of BP neural network.

The steps S31 to S33 are repeated to continuously adjust distribution of weights of the output layer and the hidden layers, to complete preliminary establishment of the BP neural network; and S35, testing of BP neural network.

One group of refractive indexes in the test set is selected and input refractive indexes to the preliminarily established BP neural network for evaluation, and if the established BP neural network satisfies a prediction result, determining that the establishment of the BP neural network is complete, or if the established BP neural network cannot satisfy the prediction result, repeating the steps S31 to S34, to reestablish a BP neural network.

Step S104, refractive index prediction.

Refractive indexes of meteorological parameters to be predicted are calculated, and input to the established BP neural network to predict the refractive index.

Embodiment 3

In this embodiment, in the case of meteorological data under abnormal weather conditions, a BP neural network is established to predict a tropospheric refractive index in the future. Abnormal weather generally refers to an abnormal phenomenon which features small spatial scale, short life history, and obvious suddenness or in which the variation tendency of meteorological parameters is different from that under normal conditions. For example, abnormal weather conditions include temperature inversion, short-term heavy rainfall, typhoon, high temperature, fog, and the like.

According to the present invention, the difference between this embodiment and Embodiments 1 and 2 lies in that a database is formed through meteorological data of abnormal weather, refractive indexes are calculated, and a BP neural network is established to predict a refractive index.

Figure 4:
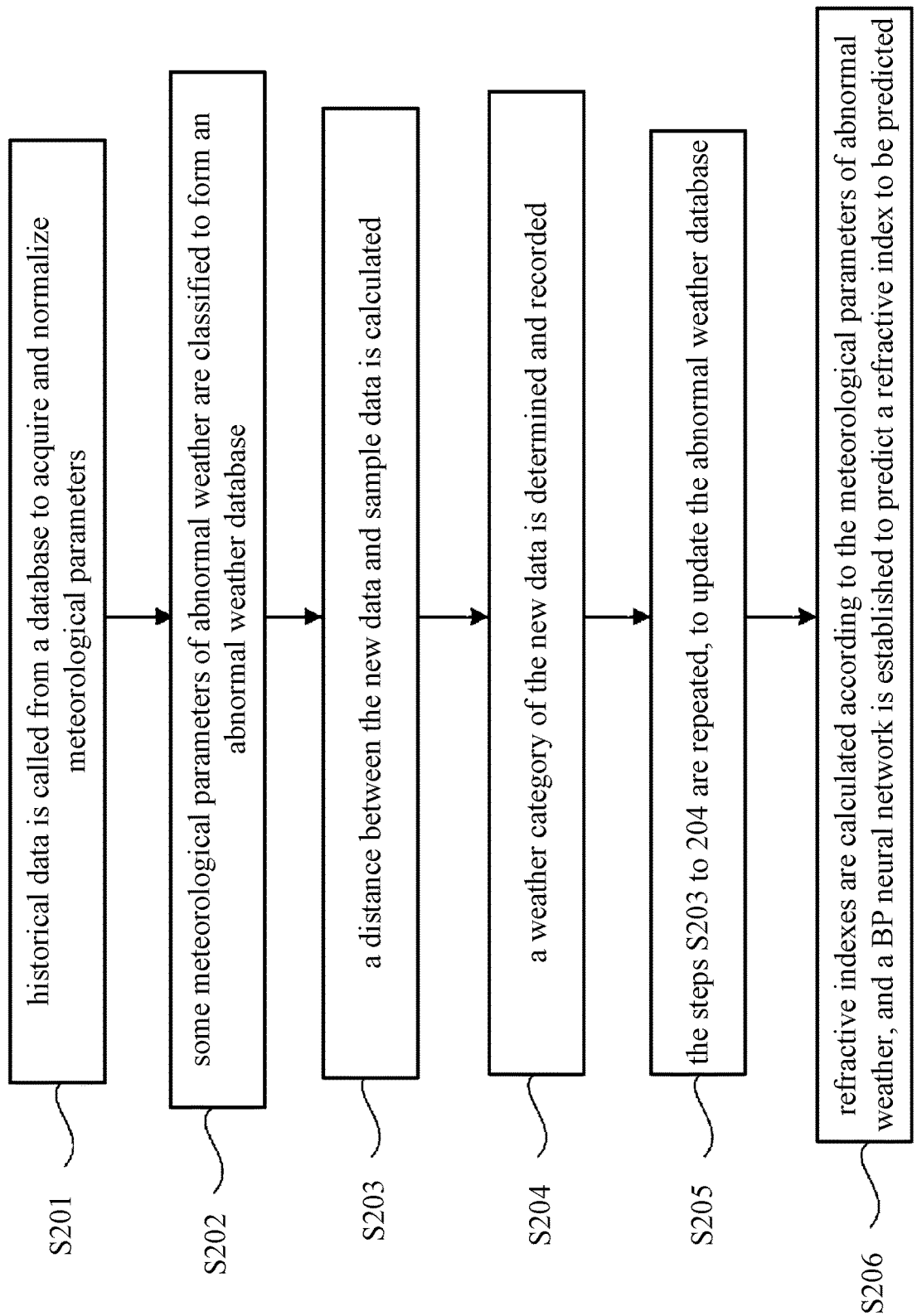
FIG. 4 is a flowchart of predicting a refractive index under abnormal weather conditions according to an embodiment of the present invention.

Specifically, FIG. 4 is a flowchart of predicting a refractive index under abnormal weather conditions according to an embodiment of the present invention. The processor executes the following instructions:

step S201, historical data is called from a database to acquire and normalize meteorological parameters (for example, air temperature, air pressure, temperature or other meteorological parameters).

Step S202, some meteorological parameters of abnormal weather are classified to form an abnormal weather database.

In this embodiment, some meteorological parameters of abnormal weather may be classified by using a manual classification method.

Step S203, when a piece of new meteorological parameter data is input to the abnormal weather database, the number of peak values that appear within a period of time on a curve of the meteorological parameter with time as well as a slope of the curve of the meteorological parameter with time within a period of time are introduced, and a distance between the new data and sample data is calculated.

Figure 5:
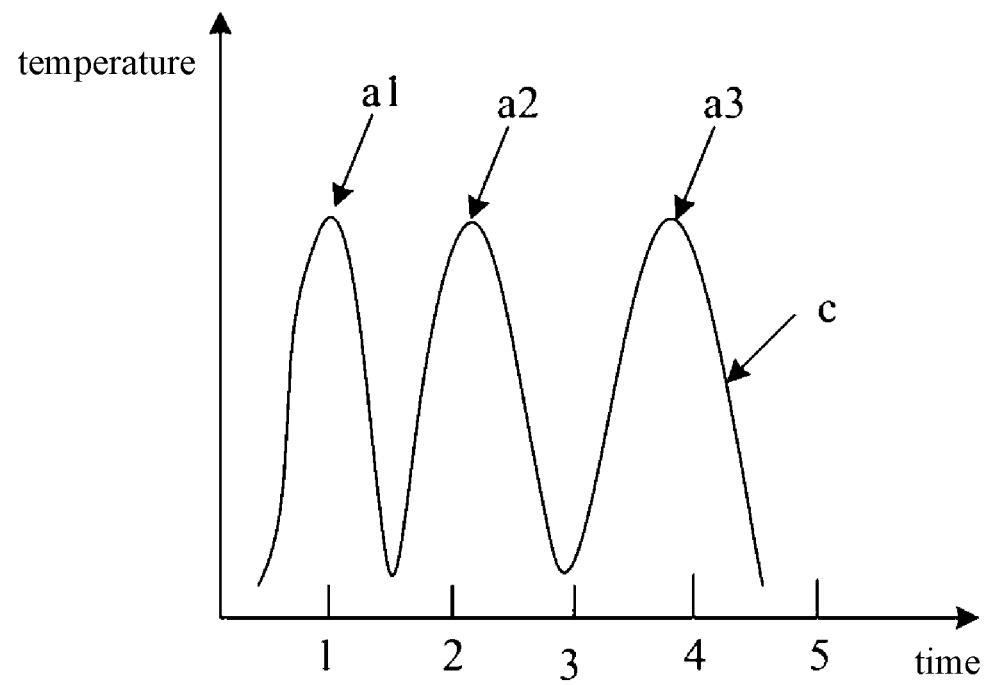
FIG. 5 is a schematic diagram of the number of peak values that appear on a curve of a meteorological parameter with time as well as a slope of the curve under abnormal weather conditions according to an embodiment of the present invention.
Figure 5:
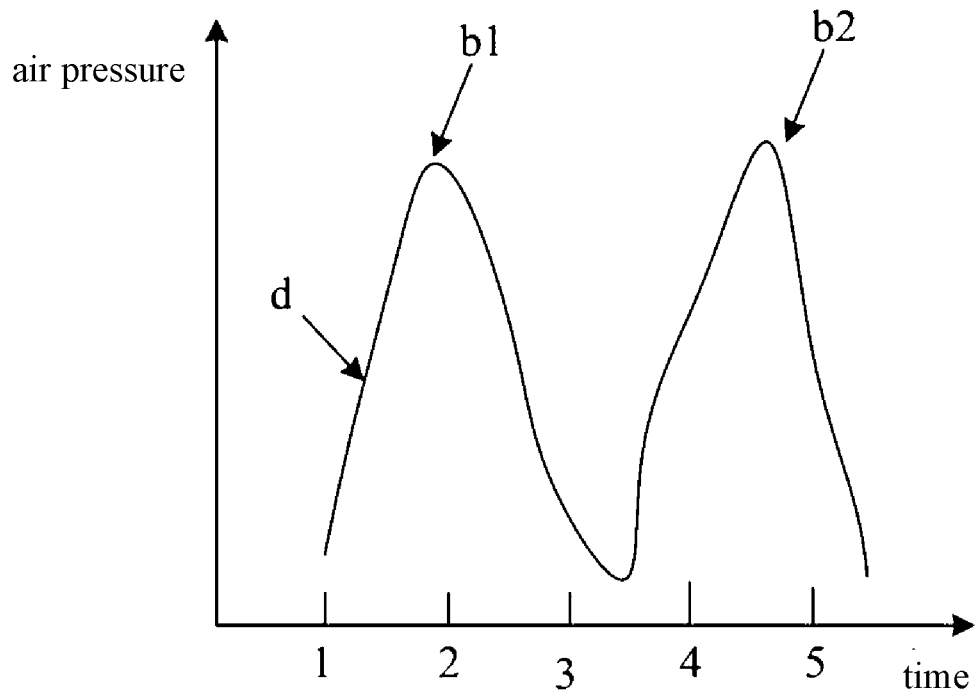

For example, FIG. 5 is a schematic diagram of the number of peak values that appear on a curve of a meteorological parameter with time as well as a slope of the curve under abnormal weather conditions according to an embodiment of the present invention. Within 1 to 5 hours, temperature has three peak values a1, a2, and a3 as time changes, air pressure has two peak values b1 and b2 as time changes. A slope of the curve of the meteorological parameter with time within 1 to 5 hours (slopes of curves c and d with time in FIG. 5).

According to an embodiment of the present invention, the distance between the new data and the sample data may be calculated through an Euclidean distance, a Manhattan distance, a Chebyshev distance, or a Hamming distance. It should be appreciated that as used herein, the sample data refers to sample data in the formed abnormal weather database. In this embodiment, the Euclidean distance is calculated:

$$D_2(x, y) = \sqrt{\sum_{i=1}^{n} |x_i - y_i|^2},$$

where $x_1, x_2, x_3 \ldots x_n$ are meteorological parameters of the sample data, such as air pressure, temperature, and precipitation, the introduced number of peak values that appear within a period of time on a function of the meteorological parameter with time, and the introduced slope of the curve of the meteorological parameter with time within a period of time.

$y_1, y_2, y_3 \ldots y_n$ are meteorological parameters of the new data, such as air pressure, temperature, and precipitation, the introduced number of peak values that appear within a period of time on a function of the meteorological parameter with time, and the introduced slope of the curve of the meteorological parameter with time within a period of time.

Figure 6:
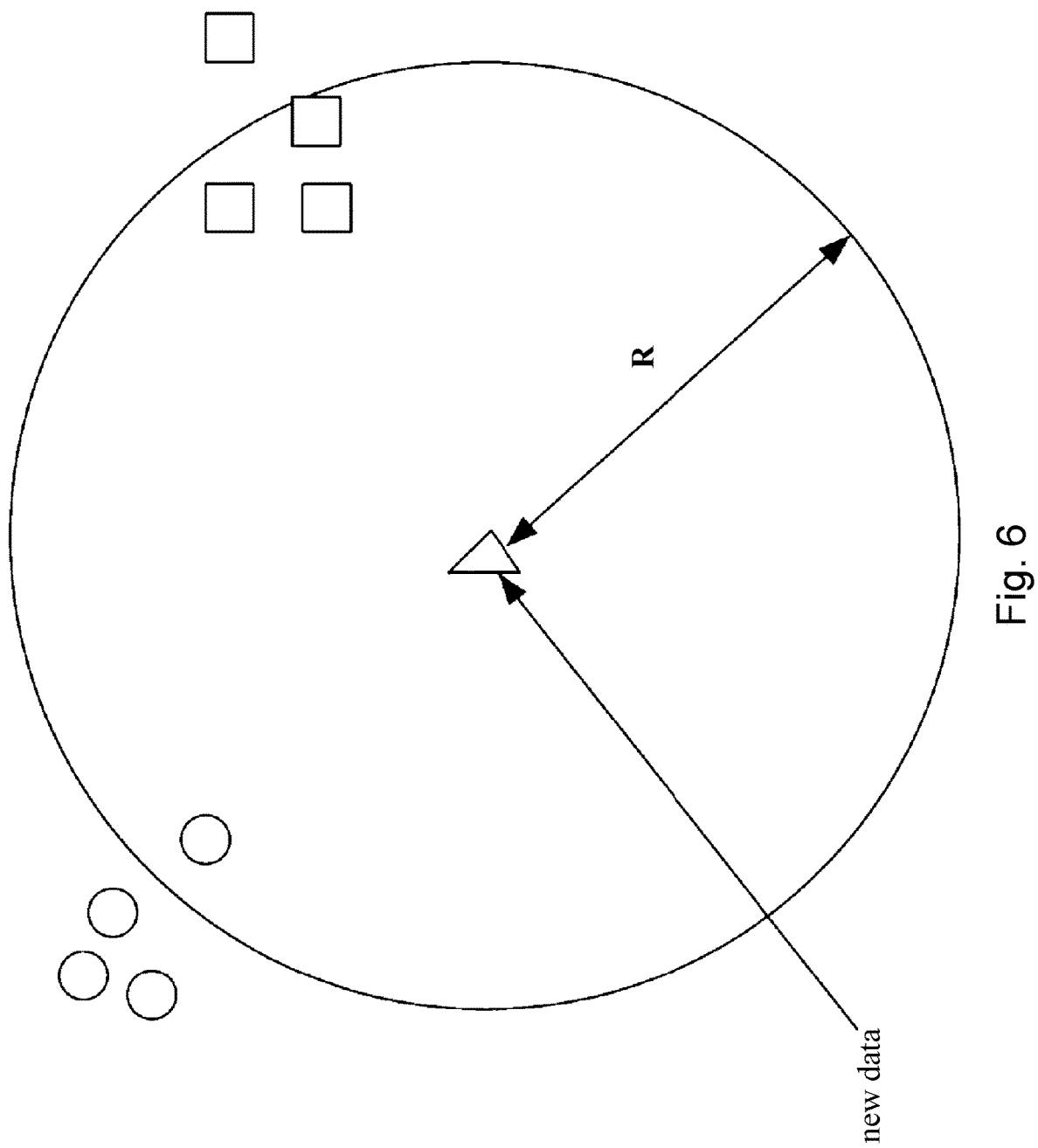
FIG. 6 is a schematic diagram of determining a weather category of new data under abnormal weather conditions according to an embodiment of the present invention.

Step S204, within a range using new data as an origin and having a diameter of R, a weather category of the new data is determined and recorded according to frequencies of occurrence of different weather categories. FIG. 6 is a schematic diagram of determining a weather category of new data under abnormal weather conditions according to an embodiment of the present invention. Within a range using new data (denoted by a triangle in FIG. 6) as an origin and having a diameter of R, a weather category of the new data is determined according to frequencies of occurrence of typhoon (denoted by square blocks in FIG. 6) and abnormal hot weather (denoted by small circles in FIG. 6). In this embodiment, within the range using the new data as the origin and having the diameter of R, the frequency of occurrence of typhoon is 3, and the frequency of occurrence of abnormal hot weather is 1. In this case, it is determined that the new data is typhoon, and the weather category of the new data is recorded.

Step S205, a next piece of new meteorological data is input to the abnormal weather database, and the steps S203 to S204 are repeated, to update the abnormal weather database.

Step S206, refractive indexes are calculated according to the meteorological parameters of abnormal weather, and a BP neural network is established to predict a refractive index to be predicted.

The calculation of the refractive indexes and the establishment of the BP neural network are implemented by using the methods used in Embodiment 1 or 2, which will not be repeatedly described in this embodiment.

The ground-based augmentation system capable of predicting a tropospheric refractive index with high precision according to the present invention forms a function relationship between inputs and outputs by training with sample data, and for each piece of new sample data that is input, generates a group of errors, distributes the errors to nodes through partial derivatives, and corrects weights of the errors, so as to minimize the final error caused by the network.

The ground-based augmentation system capable of predicting a tropospheric refractive index with high precision according to the present invention uses cross-combinations to expand the amount of data under normal weather conditions and in the case of a small amount of climatological data, so that a small error is obtained in the case of a small sample, thus helping the BP neural network to predict the tropospheric refractive index, and improving the precision of refractive index prediction.

The ground-based augmentation system capable of predicting a tropospheric refractive index with high precision according to the present invention determines the weather category of the new data under abnormal weather conditions; introduces the number of peak values that appear within a period of time on a curve of the meteorological parameter with time, as well as a slope of the curve of the meteorological parameter with time within a period of time, air temperature, and air pressure; and calculates a distance between the new data and sample data, to determine the weather category of the new data, thus helping the BP neural network to predict the tropospheric refractive index, and improving the prediction precision.

The ground-based augmentation system capable of predicting a tropospheric refractive index with high precision according to the present invention predicts the tropospheric refractive index for different weather conditions, thus improving the precision of tropospheric refractive index prediction. In some airports having a small amount of climatological data or airports where the construction of ground facilities has not been completed, cross-combinations can be used to expand the amount of data for prediction. In airports where the construction of ground facilities has not been completed and many climate data have been observed, if certain equipment at the airport fails and there is an urgent need to land, the atmospheric refractive index can be transmitted from a ground terminal to an airborne terminal by using a prediction method involving a large amount of data, and then the tropospheric delay is calculated, so as to eliminate this part of error.

Based on the description and practice of the present invention as disclosed herein, other embodiments of the present invention can be readily figured out and understood by those skilled in the art. The descriptions and embodiments should be considered as examples only, and the true scope and concept of the present invention are subject to claims.

What is claimed is:

1. A ground-based augmentation system (GBAS) capable of predicting a tropospheric refractive index with high precision, the system comprising a ground base station and an airborne receiver, wherein
the ground base station comprises a ground acquisition device, a processor, and a transmitter, wherein the ground acquisition device is configured to acquire meteorological parameters of a plurality of years, and use the acquired meteorological parameters as historical data,
the processor is configured to call the historical data and establish a back propagation (BP) neural network to predict a refractive index, and
the transmitter is configured to send the refractive index predicted by the processor to the airborne receiver; and
wherein the processor executes the following instructions:
a) calling historical data from a database to acquire meteorological parameters;
b) calculating refractive indexes according to the acquired meteorological parameters;
c) establishing a BP neural network, comprising the following steps:
c1) grouping the refractive indexes obtained in the step b) into x groups, each group having an interval $$i = \frac{N_{max} - N_{min}}{x},$$

wherein $N_{max}$ is a maximum value of the obtained refractive indexes, and $N_{min}$ is a minimum value of the obtained refractive indexes;
c2) drawing a distribution histogram of frequencies of occurrence of refractive indexes based on the groups obtained in the step c1), calculating frequencies $p_1, p_2 \ldots p_p$ of the groups of refractive indexes, and dividing the refractive indexes into a test set and a training set according to a data amount of each group of refractive indexes corresponding to the frequency of each group of refractive indexes; and
setting the number of hidden layers of the BP neural network, and forwardly passing each group of refractive indexes through an input layer, the hidden layers, and an output layer;
c3) calculating an error of each group of refractive indexes in the BP neural network during a forward pass process, distributing the error to the output layer, the hidden layers, and the input layer to initiate a backward pass, to correct weights of the output layer and the hidden layers;
c4) repeating the steps c1) to c3) to continuously adjust distribution of weights of the output layer and the hidden layers, to complete preliminary establishment of the BP neural network; and
c5) selecting a refractive index from the test set, inputting the refractive index to the preliminarily established BP neural network for evaluation, and if the established BP neural network satisfies a prediction result, determining that the establishment of the BP neural network is complete, or if the established BP neural network cannot satisfy the prediction result, repeating the steps c1) to c4), to reestablish a BP neural network; and
d) calculating refractive indexes of meteorological parameters to be predicted, and inputting the refractive indexes to the established BP neural network to predict the refractive index.

2. The system according to claim 1, wherein the refractive index is calculated from the meteorological parameters by using the following method:

$$N_w = \frac{k_2 e}{T} + \frac{k_3 e}{T^2},$$

$$N_d = \frac{k_1 P}{T},$$

$$N_i = N_w + N_d,$$

wherein, $k_1$=77.604, $k_2$=64.79, $k_3$=377,600, e is pressure of water vapor (hpa), P is barometric pressure (Pa), T is temperature (K), $N_w$ is a tropospheric wet refractive index, $N_d$ is a tropospheric dry refractive index, and $N_i$ is a tropospheric refractive index.

3. The system according to claim 1, wherein the number of hidden layers of the BP neural network is calculated by using the following method:

$$l = \sqrt{n+m} + a,$$

wherein, l is the number of hidden layers, n is the number of neurons in the input layer, m is the number of neurons in the output layer, and a is a number from 0 to 10, inclusive.

4. The system according to claim 1, wherein the data amount of each group of refractive indexes corresponding to the frequency of each group of refractive indexes satisfies the following relationship:

$$p_{ij} = \frac{p_i}{p_j} = \frac{n_i}{n_j},$$

wherein $p_i$ is the frequency of the ith group of refractive indexes, $p_j$ is the frequency of the jth group of refractive indexes, $n_i$ is the number of refractive indexes selected from the ith group, $n_j$ is the number of refractive indexes selected from the jth group, and $p_{ij}$ is a ratio of the frequency of the ith group of refractive indexes to the frequency of the jth group of refractive indexes.

5. The system according to claim 1, wherein in the process of forwardly passing each group of refractive indexes through the input layer, the hidden layers, and the output layer, each group of refractive indexes is processed as follows before being input to the input layer:
$N_p = N_i - \overline{N}$, wherein $N_p$ is a difference between a refractive index of each day and an average value, $N_i$ is the refractive index of each day, and $\overline{N}$ is the average value of refractive indexes;
the ith neuron output in the hidden layer satisfies:

$$a1_i = f_1\left(\sum_{j=1}^{r} w1_{ij} N_p\right), i = 1, 2, 3, \ldots s,$$

wherein, $a1_i$ is the ith neuron output in the hidden layer, and $w1_{ij}$ is a weight corresponding to the jth neuron input in the hidden layer and the ith neuron output in the hidden layer;

the kth neuron output in the output layer satisfies:

$$a2_k = f_2\left(\sum_{i=1}^{r} w2_{ki}a1_i\right), k = 1, 2, \ldots, s,$$

wherein $w2_{ki}$ is a weight corresponding to the ith neuron input in the output layer and the kth neuron output in the output layer, $a1_i$ is the ith neuron output in the hidden layer, $a2_k$ is the kth output in the output layer, and $f_1$ and $f_2$ are activation functions.

6. The system according to claim 1, wherein the error of each group of refractive indexes in the BP neural network during the forward pass process is calculated by using the following method:

$$E_1 = \frac{1}{2}\sum_{k=1}^{s}(N_p - a2_k)^2,$$

wherein $N_p$ is a difference between a refractive index of each day and an average value, $a2_k$ is the kth neuron output in the output layer, and $E_1$ is a predicted squared error.

7. The system according to claim 1, wherein the error of each group of refractive indexes in the BP neural network during the forward pass process is weighted:
$E(W, B) = c_m E_1$, wherein $c_m$ is a weight, $E_1$ is a predicted squared error, and $E(W, B)$ is a weighted prediction error.

8. The system according to claim 1, wherein in the backward pass, the weights of the output layer and the hidden layers are corrected by using the following method:
1) a weight correction value of the output layer is calculated by using the following method:

$$\Delta w2_{ki} = -\eta\frac{\partial E}{\partial w2_{ki}} = -\eta\frac{\partial E}{\partial a2_k}\frac{\partial a2_k}{\partial w2_{ki}},$$

wherein $\Delta w2_{ki}$ is a weight correction value corresponding to the ith neuron input in the output layer and the kth neuron output in the output layer, $a2_k$ is the kth neuron output in the output layer, and $w2_{ki}$ is a weight corresponding to the ith neuron input in the output layer and the kth neuron output in the output layer, E is a weighted prediction error, and $\eta$ is a rate of descent;
2) a weight correction value of the hidden layers is calculated by using the following method:

$$\Delta w1_{ij} = -\eta\frac{\partial E}{\partial w1_{ij}} = -\eta\frac{\partial E}{\partial a2_k}\frac{\partial a2_k}{\partial a1_i}\frac{\partial a1_i}{\partial w1_{ij}},$$

wherein $\Delta w1_{ij}$ is a weight correction value corresponding to the jth neuron input in the hidden layer and the ith neuron output in the hidden layer, $a1_i$ is the ith neuron output in the hidden layer, $a2_k$ is the kth neuron output in the output layer, $w1_{ij}$ is a weight corresponding to the jth neuron input in the hidden layer and the ith neuron output in the hidden layer, E is a weighted prediction error, and $\eta$ is a rate of descent.

9. A ground-based augmentation system (GBAS) capable of predicting a tropospheric refractive index with high precision, the system comprising a ground base station and an airborne receiver, wherein
the ground base station comprises a ground acquisition device, a processor, and a transmitter, wherein the ground acquisition device is configured to acquire meteorological parameters of a plurality of years, and use the acquired meteorological parameters as historical data,
the processor is configured to call the historical data and establish a back propagation (BP) neural network to predict a refractive index, and
the transmitter is configured to send the refractive index predicted by the processor to the airborne receiver; and
wherein the processor executes the following instructions:
A) calling historical data from a database to acquire meteorological parameters;
B) calculating refractive indexes according to the acquired meteorological parameters;
C) establishing a BP neural network, comprising the following steps:
C1) grouping the refractive indexes obtained in the step B) into x groups, selecting a cross combination of x−2 groups of refractive indexes as a training set, and selecting either of the remaining two groups of refractive indexes as a test set; and
setting the number of hidden layers of the BP neural network, and forwardly passing each group of refractive indexes in the training set through an input layer, the hidden layers, and an output layer;
C2) calculating an error of each group of refractive indexes in the BP neural network during a forward pass process, distributing the error to the output layer, the hidden layers, and the input layer to initiate a backward pass, to correct weights of the output layer and the hidden layers;
C3) repeating the step C1) to C2) to continuously adjust distribution of weights of the output layer and the hidden layers, to complete preliminary establishment of the BP neural network; and
C4) selecting one group of refractive indexes in the test set, inputting the selected group of refractive indexes to the preliminarily established BP neural network for evaluation, and if the established BP neural network satisfies a prediction result, determining that the establishment of the BP neural network is complete, or if the established BP neural network cannot satisfy the prediction result, repeating the steps C1) to C3), to reestablish a BP neural network; and
D) calculating refractive indexes of meteorological parameters to be predicted, and inputting the refractive indexes to the established BP neural network to predict the refractive index.

* * * * *